United States Patent [19]

Adar et al.

[11] Patent Number: 5,195,161
[45] Date of Patent: Mar. 16, 1993

[54] OPTICAL WAVEGUIDE COMPRISING BRAGG GRATING COUPLING MEANS

[75] Inventors: Renen Adar, Westfield; Charles H. Henry, Skillman; Rudolf F. Kazarinov, Martinsville, all of N.J.; Rodney C. Kistler, Easton, Pa.

[73] Assignee: AT&T Bell Laboratories, Murray Hill, N.J.

[21] Appl. No.: 806,941

[22] Filed: Dec. 11, 1991

[51] Int. Cl.$^5$ .............................................. G02B 6/10
[52] U.S. Cl. ..................................... 385/129; 385/37; 385/131
[58] Field of Search ................... 385/129, 37, 130, 131

[56] References Cited

U.S. PATENT DOCUMENTS 4,531,809 7/1985 Carter et al. ........................... 385/37

OTHER PUBLICATIONS

"Glass Waveguides on Silicon for Hybrid Optical Packaging", by C. H. Henry et al, *Journal of Lightwave Technology*, vol. 7, No. 10, Oct. 1989, pp. 1530–1539.
"Silica Waveguides on Silicon and Their Application to Integrated-Optic Components", by M. Kawachi, *Optical and Quantum Electronics*, vol. 22, 1990, pp. 391–416.
"Compound Bragg Reflection Filters Made by Spatial Frequency Doubling Lithography", by C. H. Henry et al, *Journal of Lightwave Technology*, vol. 7, No. 9, Sep. 1989, pp. 1379–1385.
"Four-Channel Wavelength Division Multiplexers and Bandpass Filters Based on Elliptical Bragg Reflectors", by C. H. Henry et al, *Journal of Lightwave Technology*, vol. 8, No. 5, May 1990, pp. 748–755.

*Primary Examiner*—John D. Lee
*Assistant Examiner*—S. Barns
*Attorney, Agent, or Firm*—E. E. Pacher

[57] ABSTRACT

Disclosed are planar waveguides comprising substantially polarization-independent Bragg gratings. A preferred embodiment of the invention comprises a Si body with a silica lower cladding layer thereon, and a phosphorus P-doped silica core on the lower cladding. Appropriate periodic recessed features are etched into the core, and phophorus P- and B-doped silica upper cladding is deposited over the core. The dopant concentrations are adjusted such that the refractive index difference between core and upper cladding is small $(0.35-1.45 \times 10^{-2})$, and such that the flow temperature of the upper cladding material is lower than that of the core material. In another preferred embodiment a thin layer of $Si_3N_x (x \sim 4)$ is conformally deposited over the core after the grating etch, and the upper cladding material is deposited onto the $Si_3N_x$ layer. Bragg devices according to the invention are advantageously used in Integrated Optical Circuits (IOCs), e.g. in IOCs used in WDM optical communication systems.

10 Claims, 9 Drawing Sheets

OPTICAL WAVEGUIDE COMPRISING BRAGG GRATING COUPLING MEANS

FIELD OF THE INVENTION

This invention pertains to articles that comprise a planar optical waveguide comprising a Bragg grating.

BACKGROUND OF THE INVENTION

Planar optical waveguides are known. See, for instance, C. H. Henry et al., *Journal of Lightwave Technology*, Vol. 7(10), p. 1530 (1989), which reviews planar waveguides fabricated on a Si substrate by a technique that comprises chemical vapor deposition. See also M. Kawachi, *Optical and Quantum Electronics*, Vol. 22, p. 391 (1990), which reviews waveguides fabricated on Si by a technique that comprises flame hydrolysis. Both of the above references are incorporated herein by reference.

Planar waveguides are indispensable features of many Integrated Optical Circuits (IOCs), typically serving to provide interconnection. However, planar waveguides can also provide filtering and other functions, and an advantageous way of making, for instance, waveguide filters and reflectors comprises embedding a Bragg grating into a planar waveguide. See, for instance, C. H. Henry et al., *Journal of Lightwave Technology*, Vol. 7(9), p. 1379 (1989), and Vol. 8(5), p. 748 (1990), both incorporated herein by reference. The former discloses a Bragg filter comprising a planar waveguide with a $Si_3N_4$ core and pure silica cladding, and the latter a waveguide with a phosphorus-doped silica core and a pure silica cladding. In the former case the grating was etched into the $SiO_2$ upper cladding layer, and in the latter by depositing and patterning a 30 nm $Si_3N_4$ film on the $SiO_2$ lower cladding layer.

Prior art planar waveguide Bragg reflectors and filters (collectively "Bragg devices") typically are quite polarization dependent. This is an obvious disadvantage in applications (e.g., optical fiber communications) in which the polarization of the radiation can vary randomly. This application discloses Bragg devices whose response can be substantially polarization-independent.

THE INVENTION

Figure 1:
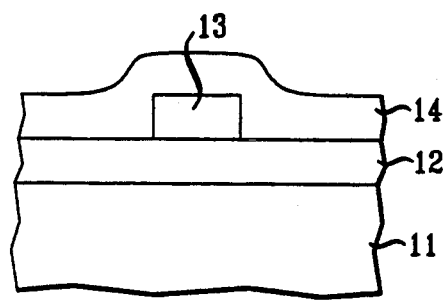
FIG. 1 schematically depicts an exemplary planar waveguide.

Articles or systems (collectively "articles") according to the invention comprise a substrate having a major surface, with a length of (typically single mode) planar waveguide on the surface. The article is adapted for coupling electromagnetic radiation into the waveguide, and comprises means for receiving at least a portion of the radiation coupled into the waveguide, after the radiation has exited from the waveguide. The substrate can be a silica body, or it can be a non-silica (e.g., Si, $Al_2O_3$) body with a silica layer thereon. This layer will generally be referred-to as the "lower cladding" layer.

The waveguide comprises an appropriately doped (e.g., with P, Ti or Ge) silica core disposed on the $SiO_2$ body or on the $SiO_2$ lower cladding layer on a non-$SiO_2$ body, and a P-doped silica upper cladding. The dopant concentrations are selected such that the upper cladding has a lower refractive index than the core. Although not so limited, the discussion below will primarily be in terms of a preferred embodiment that comprises a Si body with a silica lower cladding layer thereon, and that further comprises a P-doped core.

The length of waveguide comprises a first portion wherein the core comprises a periodic multiplicity of spaced apart recessed features, to be referred to as a Bragg grating. Associated with the Bragg grating is a center wavelength $\lambda_o$, an amplitude at $\lambda_o$, and a bandwidth, each for TE and TM polarization, respectively. Significantly, the refractive index difference $\Delta n$ between the core and the upper cladding is small, typically in the range $0.35 \times 10^{-2}$–$1.45 \times 10^{-2}$, preferably in the range $0.6 \times 10^{-2}$–$1.3 \times 10^{-2}$, and the bandwidth and amplitude of the Bragg grating are substantially independent of the polarization of the radiation, i.e., are substantially the same for radiation of TE and TM polarization. The center wavelength typically is also substantially polarization-independent.

The center wavelength is "substantially the same" for TE and TM polarization if $\Delta \lambda_o / BM$ is less than 0.3, preferably less than 0.2 or even 0.1, where $\Delta \lambda_o = |\lambda_{0,TM} - \lambda_{0,TE}|$, and "BW" stands for the average bandwidth for the two polarizations. The bandwidth herein is the full width at half maximum (FWHM), and is "substantially the same" for TE and TM polarization if $\Delta BW / BW$ is less than 0.2, preferably less than 0.15 or even 0.1, where $\Delta BW$ is the absolute bandwidth difference for the two polarizations, and BW is as defined above. By "amplitude associated with the Bragg grating" we mean herein the reflection or transmission at the appropriate $\lambda_o$, as the case may be. The amplitude is "substantially the same" for TE and TM polarization if the amplitudes differ by less than 10%, preferably less than 5% or even 3%.

In a currently preferred embodiment the upper cladding further comprises an index-lowering dopant (typically B), with the dopant concentration selected such that the upper cladding material has a flow temperature lower than that of the core material, such that the upper cladding material can be caused to substantially completely fill the recessed features in the core.

Some embodiments of the invention comprise means for reducing or eliminating residual strain birefringence associated with the first portion of the waveguide. Exemplarily such means comprise a "trench", an elongate recessed feature that is spaced from, and parallel with, the core, and extends into the lower cladding.

Some embodiments comprise a layer of first material (e.g., $Si_3N_4$) that is disposed between core and top cladding and substantially conformally covers the surface of at least some of the recessed features in the core, the first material having a refractive index that is higher than that of the upper cladding material. In many of these embodiments the width of the recessed features in the core is less than about $0.4\Lambda$ or greater than about $0.6\Lambda$, where $\Lambda$ is the grating period.

FIG. 1 schematically depicts in cross section an exemplary planar waveguide. Numeral 11 refers to the Si body, 12 to the relatively thick (e.g., about 15 $\mu$m) silica lower cladding, 13 to the doped silica core, and 14 to the doped silica upper cladding. In preferred embodiments the upper cladding is doped with phosphorus and an index-lowering element, typically B. Exemplarily, the core nominally contains 8 weight % phosphorus, and the upper cladding nominally contains 4 weight % each of phosphorus and B, such that the index difference $\Delta n$ between core and upper cladding is about 0.01. Doping of core and upper cladding such that $\Delta n$ is relatively small is an important aspect of the invention, and is significant for attainment of substantial polarization independence.

Waveguides according to the invention can be made by any appropriate process, e.g., the process described by M. Kawachi (op. cit.). However, we currently prefer a process that involves chemical vapor deposition (CVD) of the core material and the upper cladding material and, when appropriate, of the first material between core and upper cladding.

Figure 2:
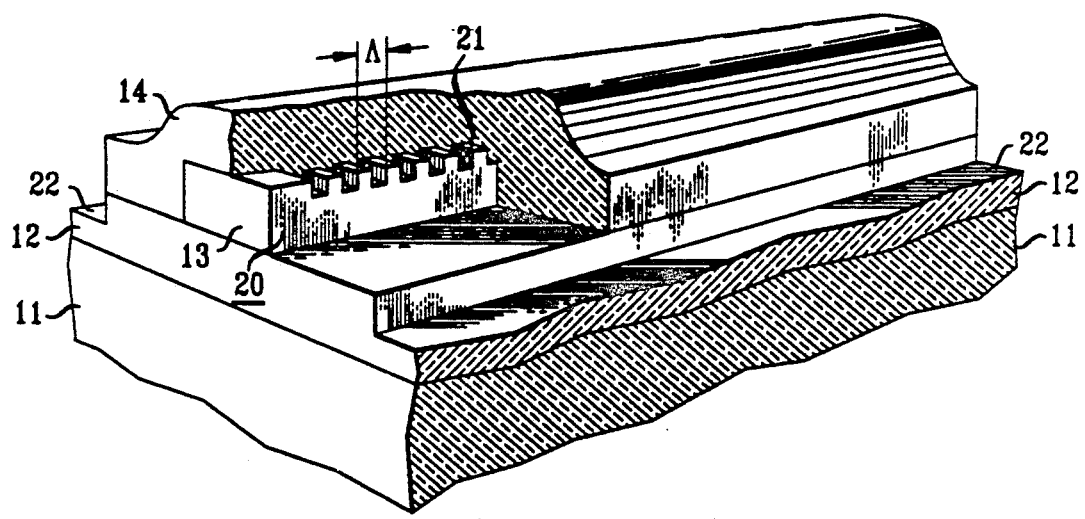
FIG. 2 shows schematically a portion of an exemplary planar waveguide with Bragg grating.

FIG. 2 shows schematically, in perspective view, a length of waveguide that comprises a first section comprising a periodic multiplicity (20) of recessed features 21 that form a Bragg grating, with period $\Lambda$. FIG. 2 also shows optional means for reducing birefringence in the first section, namely, trenches 22. The trenches extend through the upper cladding into the lower cladding layer, to a depth that is effective for reducing thermally induced strain in the core. Exemplarily, the core is about 7 $\mu$m wide and about 4 $\mu$m high, the Bragg grating is about 0.5 $\mu$m deep, and the recessed features are about 0.25 $\mu$m wide. $\Lambda$ is about 0.5 $\mu$m, the upper and lower claddings are about 7 $\mu$m and 15 $\mu$m thick, respectively, and trenches 22 extend about 3 $\mu$m into the lower cladding and are spaced about 22 $\mu$m apart.

Exemplarily, such a structure was made by forming the bottom cladding layer by conventional high pressure steam oxidation (HIPOX) of the Si substrate surface, conventional low pressure chemical vapor deposition (LPCVD) of the phosphorus-doped $SiO_2$ core material, at 450° C., followed by an anneal at 1000° C. The grating was then formed by photolithography using a deep UV stepper, such that a grating with 0.25 $\mu$m wide depressions and spacings could be etched into the core layer by RIE. After grating formation the core was patterned and dry etched by conventional means, followed by LPCVD conformal deposition at 780° of the B and phosphorus-doped $SiO_2$ upper cladding layer. Those skilled in the art will be readily able to adapt the described procedure when the use of a non-Si substrate is desired, or when the core is doped with a dopant other than phosphorus.

Figure 3:
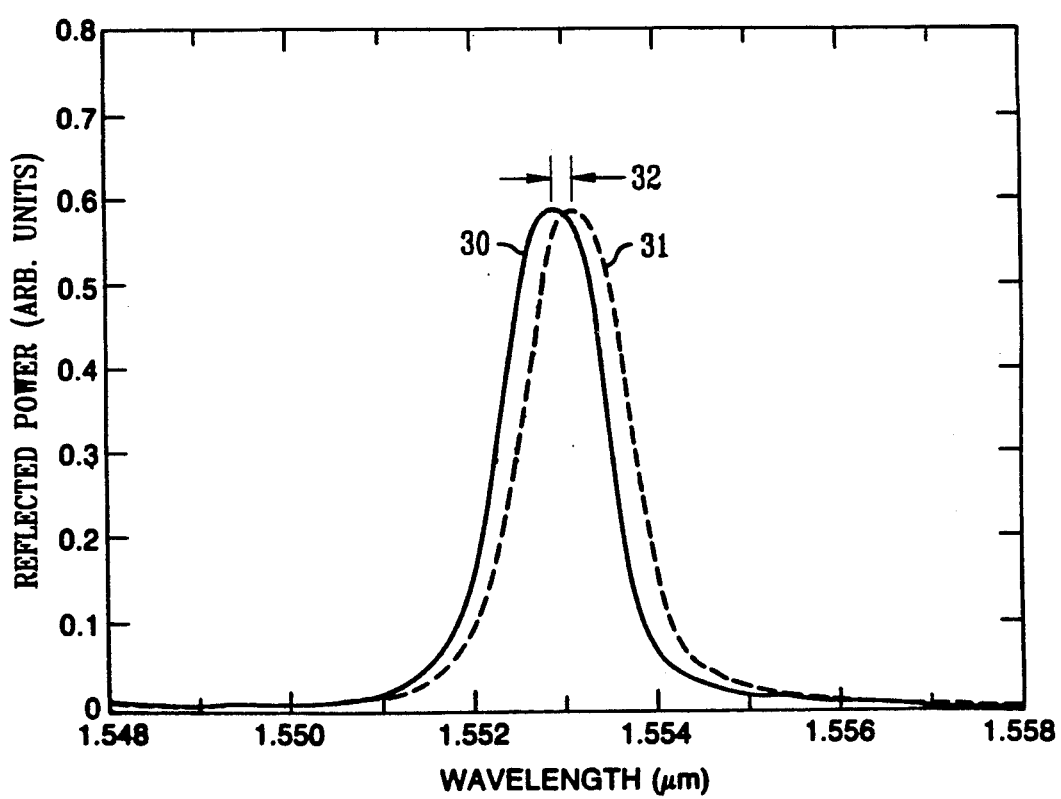
FIGS. 3 and 4 present exemplary data on power reflectivity vs. wavelength and power transmission vs. wavelength, respectively, for waveguide Bragg reflectors according to the invention.

FIG. 3 shows an exemplary curve of reflected power vs. wavelength of a planar waveguide with a 2 mm long grating, substantially as shown in FIG. 2, but not comprising optional birefringence-reducing trenches. Curves 30 and 31 are for TE and TM polarized radiation, respectively. In both cases the bandwidth is 1.31 mm, and the amplitudes are essentially identical. The difference $\Delta\lambda_o$ between the two center wavelengths is 0.3 nm. Although narrow-band Bragg gratings with $\Delta\lambda_o$ of order 0.3 mm will be acceptable for many applications, it would be advantageous to have available means for further reducing $\Delta\lambda_o$ if desired.

Figure 4:
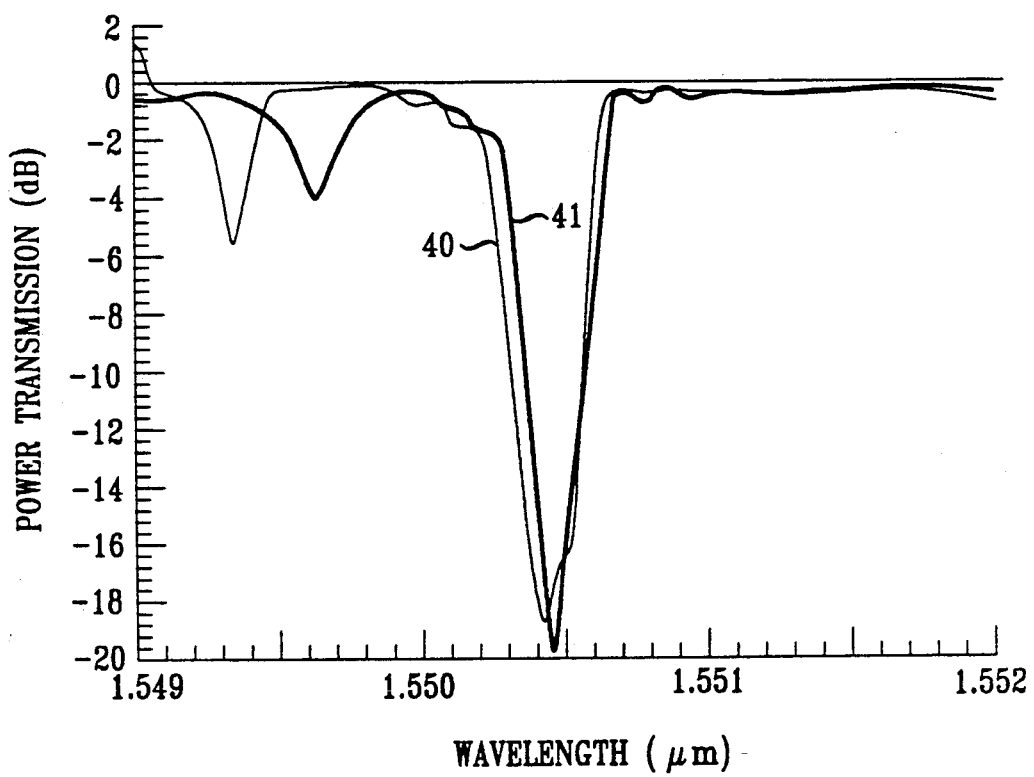

FIG. 4 shows power transmission vs. wavelength for an 8 mm long grating (annealed 2 hours at 900° C. in $N_2$ after trench etching) with two trenches (22 $\mu$m separation, extending 3 $\mu$m into the lower cladding) substantially as shown in FIG. 2. Curves 40 and 41 are for TE and TM polarization, respectively. As can be seen from FIG. 4, $\Delta\lambda_o$ is reduced by about an order of magnitude, to about 0.03 nm, and bandwidth and amplitude are essentially polarization-independent. Increasing the trench depth can result in essentially complete elimination of birefringence.

We have found that the bandwidth associated with narrow-band Bragg gratings according to the invention typically is, inter alia, a function of grating length, with longer gratings typically associated with a more narrow bandwidth. For instance, otherwise identical Bragg reflectors with grating lengths of 2, 4 and 8 mm showed a (polarization-independent) bandwidth of 0.48, 0.37 and 0.27 nm, respectively.

Furthermore, we have found that the grating coupling strength typically is, inter alia, a function of heat treatment, with gratings becoming weaker with increasing anneal temperature. This effect is thought to be due to interdiffusion that results in somewhat less abrupt (i.e., relatively smooth) index changes at the core/upper cladding interface. The effect can be used to tailor the Bragg length (the characteristic length for Bragg reflection) and thus to control the bandwidth. Anneal temperatures in the range 850°-1000° C. are contemplated. Using different anneals, we have, for instance, changed the Bragg length of devices from 0.5 mm to 2.5 mm (2 hours at 900° C.), 5 mm (2 hours at 950° C.), and 15 mm (2 hours at 1000° C.), respectively, all in $N_2$.

The above-discussed Bragg gratings are generally associated with relatively narrow bandwidths, i.e., a narrow stop band. Such devices can advantageously serve as filters in, e.g., multichannel optical communication systems, for instance, in wavelength division multiplexing devices, semiconductor laser stabilizing elements and optical feedback elements for external cavity lasers. However, the invention can also be embodied in relatively wide bandwidth devices, and wide-band Bragg reflectors according to the invention can, for instance, improve the compactness of complicated IOCs.

Figure 5:
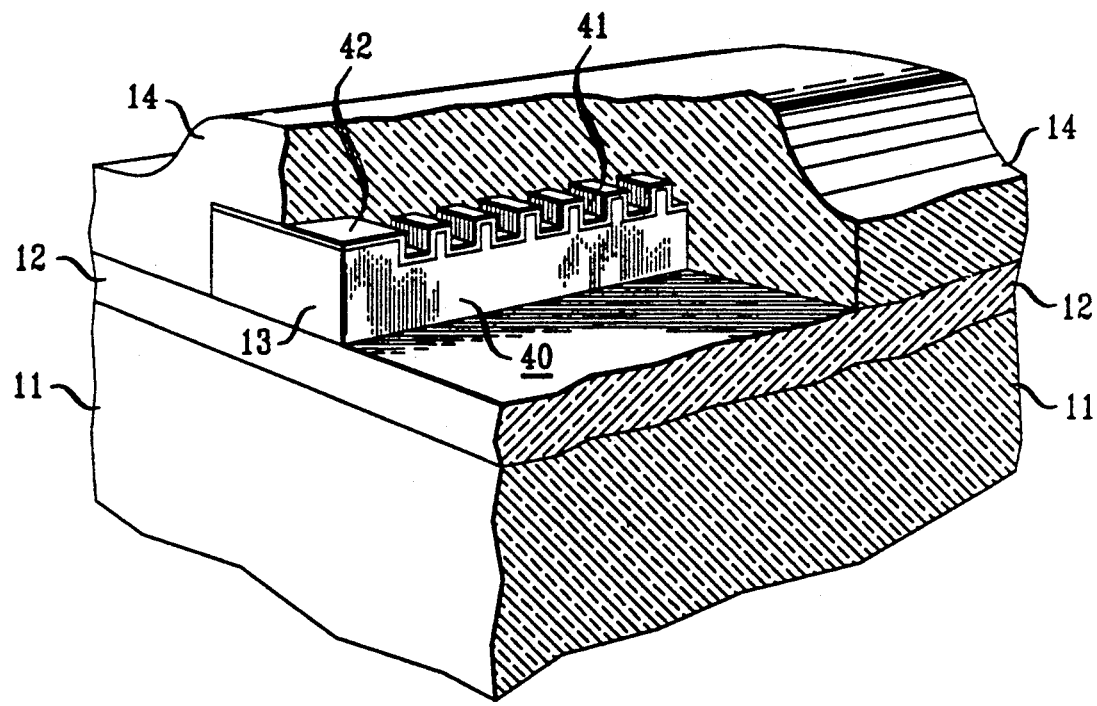
FIG. 5 shows schematically a portion of a further exemplary planar waveguide with Bragg grating.

FIG. 5 schematically depicts an exemplary embodiment of the invention that can have relatively wide bandwidth. After forming the recessed features 41 that constitute Bragg grating 40, a thin (exemplarily in the range 5-30 nm) layer of a relatively high refractive index material 42 is substantially conformally deposited on the core. Exemplarily the material has composition $Si_3N_x$ ($x \sim 4$). Such material can readily be deposited by LPCVD, as is known to those skilled in the art.

As described above, the grating can be formed by a known process involving use of a deep UV stepper. A known spatial frequency doubling lithography technique (see C. H. Henry et al., *Journal of Lightwave Tech-* nology, Vol. 7(9), p. 1379) may advantageously be used in making Bragg gratings according to the invention.

Figure 6:
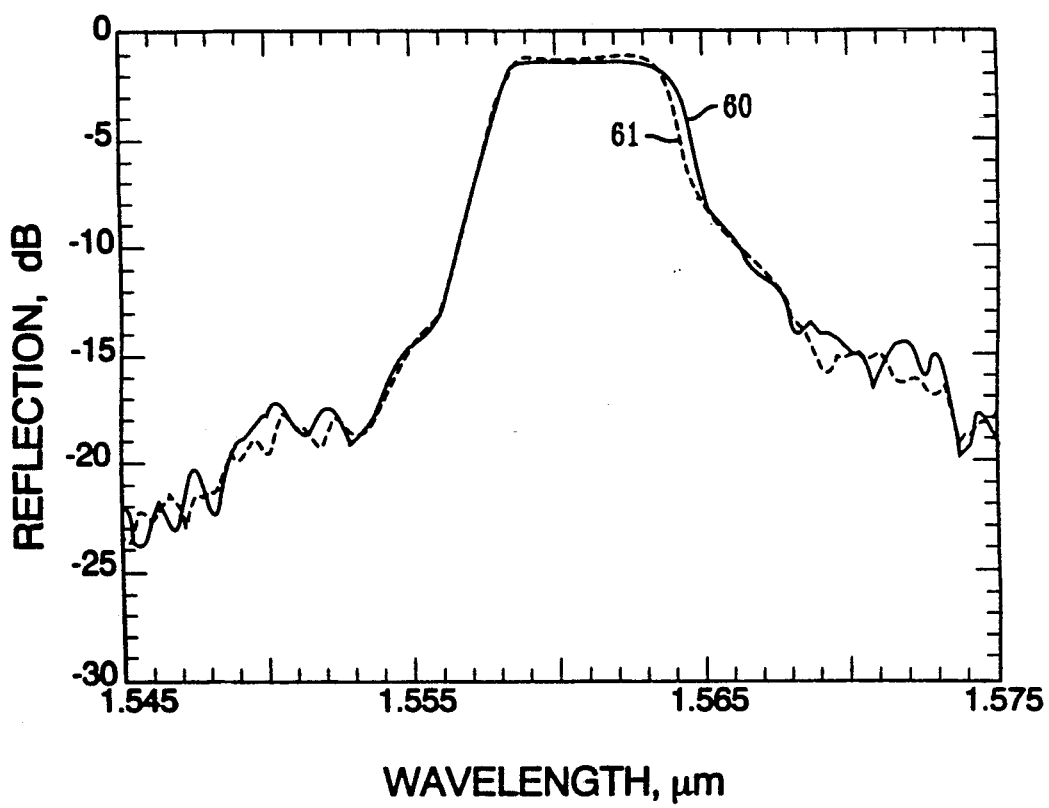
FIGS. 6 and 7 present exemplary data on reflection vs. wavelength.

FIG. 6 shows exemplary data of reflection vs. wavelength for a 2 mm long grating substantially as shown in FIG. 5, with a 10 nm thick $Si_3N_4$ layer, and a 1:10 line-to-depression ratio. Lines 60 and 61 are for TE and TM polarized radiation, respectively. As can be seen, $\lambda_o$ and amplitude are essentially polarization-independent, and the bandwidth is substantially polarization-independent (6.9 nm and 6.4 nm, respectively).

Figure 7:
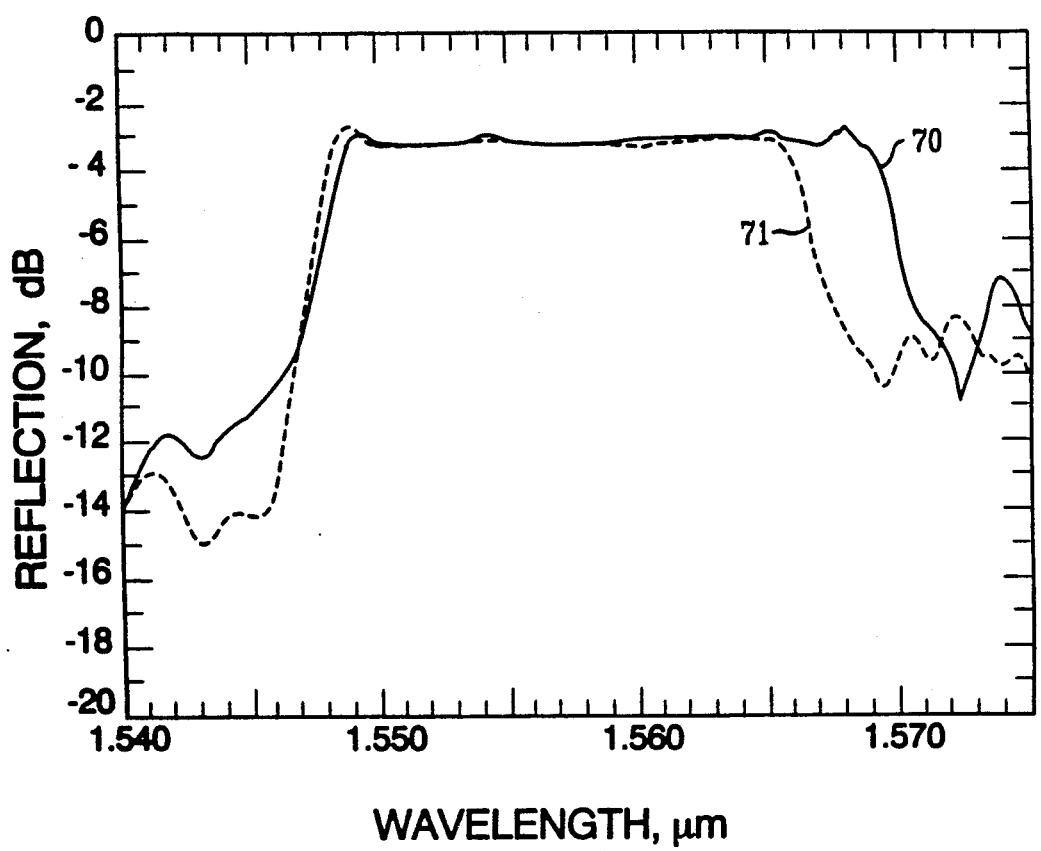

FIG. 7 shows analogous data for a 2 mm long grating substantially as shown, but with a 20 nm thick $Si_3N_4$ layer. The amplitude is again essentially polarization-independent, and $\lambda_o$ is substantially polarization-independent. The bandwidths are 22.5 nm for TE polarization (curve 70) and 19.2 nm for TM polarization (curve 71).

Figure 8:
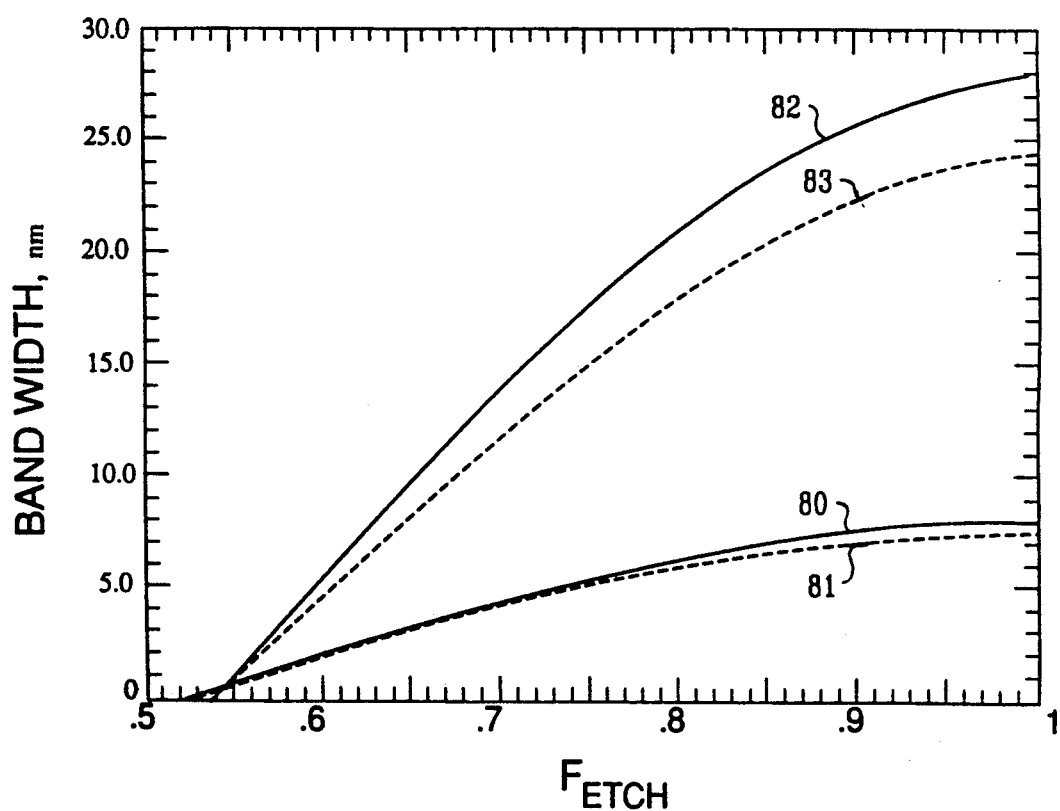
FIG. 8 presents exemplary calculated results on bandwidth vs. $F_{etch}$.
Figure 9:
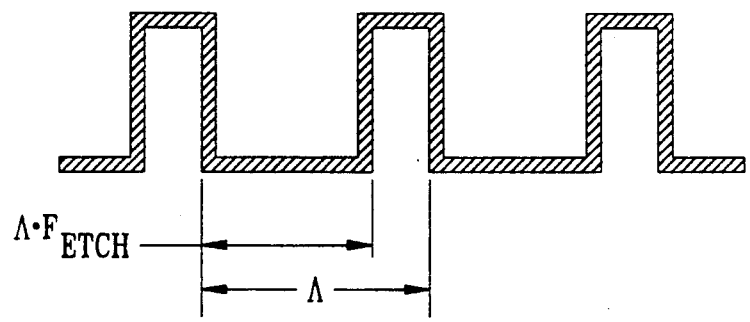
FIG. 9 defines the parameter $F_{etch}$.

FIG. 8 shows calculated curves of bandwidth vs. $F_{etch}$ (where $F_{etch}$ is defined in FIG. 9), for gratings substantially as shown in FIG. 5, with depressed feature depth of 0.5 $\mu$m, and grating period $\Lambda = 0.5$ $\mu$m. Curves 80 and 82 are for TE polarization, $Si_3N_4$ layer thickness of 10 and 20 nm, respectively, and curves 81 and 83 are for TM polarization, layer thickness of 10 and 20 nm, respectively. Attainment of substantial bandwidth requires that $F_{etch}$ be either greater than or less than 0.5, preferably greater than 0.6 or 0.8, or less than 0.4 or 0.2. FIG. 8 shows that bandwidth differences tend to increase with first material layer thickness.

The above discussion specifically dealt with Bragg gratings having $\lambda_o$ of about 1.55 $\mu$m, an important wavelength regime for optical communications. However, the invention is not limited to any particular wavelength. For instance, devices according to the invention can be designed for any desired wavelength in the range 0.8–1.6 $\mu$m, as those skilled in the art will recognize. In particular, the invention is readily embodied in articles that operate at about 1.3 $\mu$m, another wavelength regime of importance for optical communications.

Figure 10:
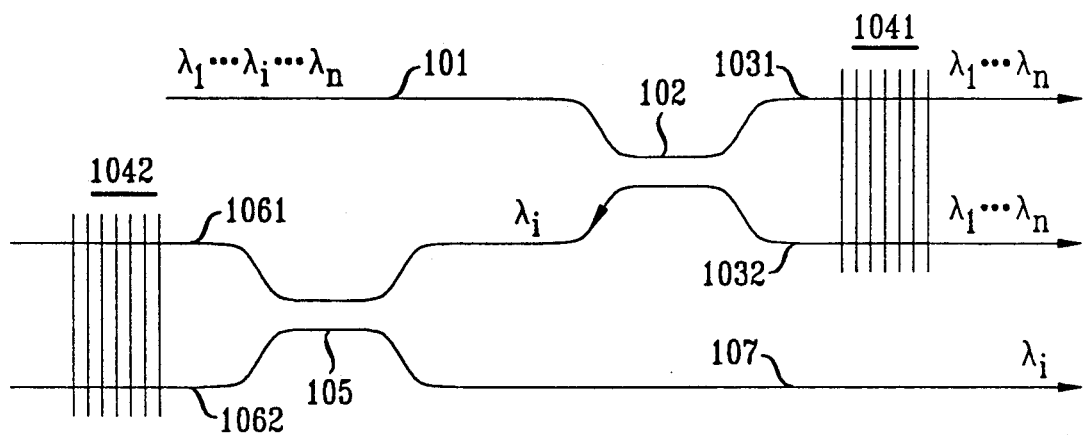
FIG. 10 schematically depicts a relevant portion of a Bragg double reflection filter according to the invention.

FIG. 10 schematically shows relevant aspects of an exemplary device that comprises a waveguide Bragg grating according to the invention. Signals of wavelengths $\lambda_1, \ldots \lambda_i, \ldots \lambda_n$ are propagating through waveguide 101 to 3-db coupler 102. The coupler divides the signal strength equally between waveguide arms 1031 and 1032. Narrow band Bragg reflection filter 1041 reflects radiation of predetermined wavelength $\lambda_i$ ($i=1,2 \ldots$ or n) back into the 3-db coupler while transmitting the other wavelengths. The radiation of wavelength $\lambda_i$ propagates to second 3-db coupler 105, is split into waveguide arms 1061 and 1062 and reflected by narrow band Bragg reflection filter 1042. The reflected radiation of wavelength $\lambda_i$ is then coupled into waveguide 107 and is available for detection. The radiation transmitted through filter 1041 can be further de-multiplexed by means substantially analogous to those shown. Coupler 105 and filter 1042 are optional. However, their presence results in advantageous device geometry and, possibly, higher signal to noise ratio.

Figure 11:
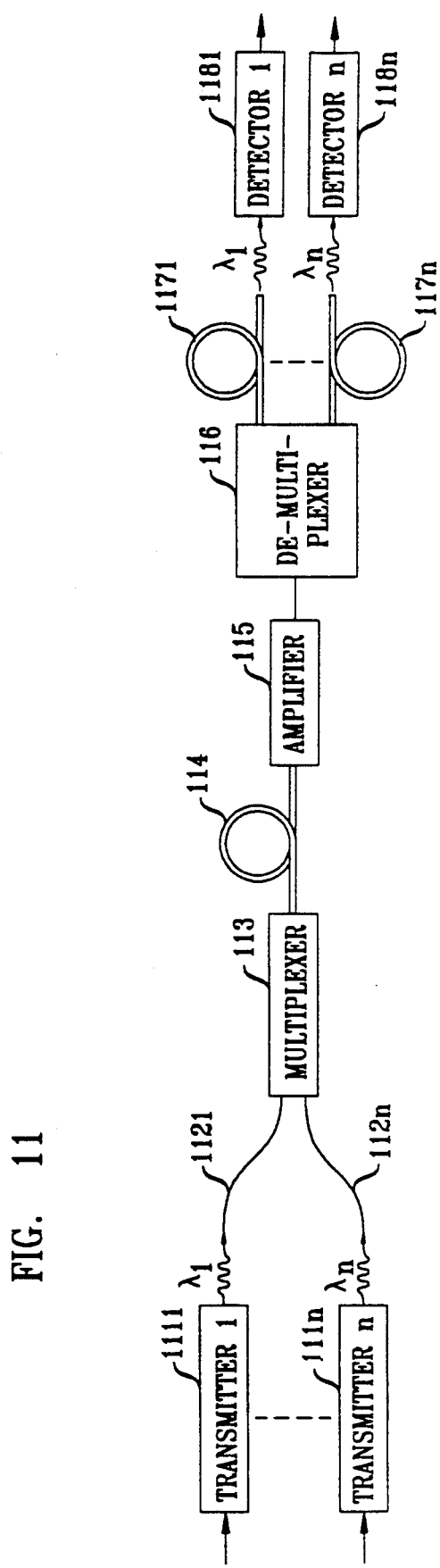
FIG. 11 shows schematically an exemplary article according to the invention, namely, an optical communication system that comprises a substantially polarization-independent de-multiplexer according to the invention.

FIG. 11 schematically depicts relevant aspects of a wavelength division multiplexed (WDM) optical fiber communication system, e.g., a system linking n remote receiving stations with n transmitters 1111-111n in a central facility. The i'th ($i=1, 2, \ldots$ or n) transmitter emits radiation of a predetermined wavelength $\lambda_i$ in response to an input signal, the radiation is coupled into waveguide 112i and propagates to multiplexer 113. After being multiplexed onto a single waveguide 114 and transmitted therethrough to optional amplifier 115 and de-multiplexer 116, the radiation is de-multiplexed, with $\lambda_i$ coupled onto waveguide 117i and transmitted to detector 118i. It will be appreciated that waveguides 114 and 117i typically comprise optical fiber. De-multiplexer 116 exemplarily comprises Bragg reflection filters of the type shown in FIG. 10, or a 1×n splitter, with the i'th of the n output waveguides comprising a Bragg filter that transmits only the radiation of wavelength $\lambda_i$.

We claim:

1. An article comprising a body having a major surface and a planar waveguide on the major surface, the article being adapted for coupling electromagnetic radiation into the waveguide, and comprising means for receiving radiation that was coupled into the waveguide and propagated through at least a portion thereof; wherein
   a) the waveguide comprises a doped silica core disposed on the body, and an upper cladding at least partially surrounding the core, the core dopant selected from the group consisting of phosphorus, Ti, and Ge;
   b) the waveguide comprises a first portion wherein the core comprises a periodic multiplicity of spaced apart recessed features that form a Bragg grating for at least some of the radiation; associated with the Bragg grating being a center wavelength $\lambda_o$ for each of the TE and TM polarizations of the radiation, a bandwidth, and an amplitude at $\lambda_o$;

CHARACTERIZED IN THAT c) the upper cladding comprises phosphorus-doped silica having a refractive index that is lower than that of the core, the refractive index difference $\Delta n$ between core and upper cladding being in the range $0.35 \times 10^{-2} - 1.45 \times 10^{-2}$, selected such that the bandwidth and amplitude at $\lambda_o$ are substantially independent of the polarization of the radiation.

2. The article of claim 1, wherein the body is a Si body with a silica layer (the lower cladding) thereon, the core is disposed on the lower cladding, the core dopant is phosphorus, and the upper cladding further comprises an index-lowering dopant, with the concentration of phosphorus and the index-lowering dopant selected such that the upper cladding has a flow temperature that is lower than that of the core, and such that the upper cladding substantially completely fills the recessed features in the core, and the waveguide is a single mode waveguide for radiation of wavelength $\lambda_o$.

3. The article of claim 2, further comprising a first material disposed between core and top cladding that substantially conformally covers at least some of the recessed features, with the first material having a refractive index that is higher than that of the upper cladding material.

4. The article of claim 3, wherein the first material has composition $Si_3N_x(x \sim 4)$, and thickness in the range 5–30 nm.

5. The article of claim 3, wherein the width of the depressed features is less than about $0.4\Lambda$ or greater than about $0.6\Lambda$, where $\Lambda$ is the period associated with the Bragg grating.

6. The article of claim 1, further comprising means adapted for reducing stress birefringence in the first portion of the waveguide.

7. The article of claim 6, wherein the means for reducing stress birefringence comprise at least one elongate trench extending into the body, the trench being spaced from and substantially parallel to the core.

8. The article of claim 1, wherein the center wavelength $\lambda_o$ is substantially independent of the polarization of the radiation.

9. The article of claim 1, wherein $\lambda_o$ is in the approximate range 0.8–1.6 μm.

10. The article of claim 1, wherein the dopant distribution in core and upper cladding is such that the refractive index changes smoothly as a function of distance across a given core/upper cladding interface.

* * * * *